United States Patent
Möller et al.

[11] Patent Number: 6,042,425
[45] Date of Patent: Mar. 28, 2000

[54] CONNECTION ELEMENT FOR PROVIDING AN ELECTRICAL CONNECTION TO ELECTRICAL ELEMENTS ARRANGED IN A GROUP

[75] Inventors: Rudolf Möller, Gehrden; Dirk Uhlmannsiek, Lehrte, both of Germany

[73] Assignee: Mannesmann Aktiengesellschaft, Düsseldorf, Germany

[21] Appl. No.: 09/064,354

[22] Filed: Apr. 22, 1998

[30] Foreign Application Priority Data

May 27, 1997 [DE] Germany .......................... 197 22 925

[51] Int. Cl.[7] ................................................. H01R 27/00
[52] U.S. Cl. .................... 439/638; 439/652; 439/931; 439/281; 439/660
[58] Field of Search ..................... 439/638, 105, 439/106, 107, 660, 652, 76.1, 281, 931

[56] References Cited

U.S. PATENT DOCUMENTS

| | | | |
|---|---|---|---|
| 3,953,099 | 4/1976 | Wilson | 439/281 |
| 5,132,877 | 7/1992 | Branan et al. | 439/931 |
| 5,246,386 | 9/1993 | Nanjo | 439/931 |
| 5,494,449 | 2/1996 | Chioo | 439/76.1 |
| 5,674,092 | 10/1997 | Wunderer | 439/652 |
| 5,746,620 | 5/1998 | Clark | 439/638 |
| 5,748,424 | 5/1998 | Hung | 439/652 |
| 5,788,521 | 8/1998 | Milan | 439/76.1 |
| 5,857,875 | 1/1999 | Hsu et al. | 439/652 |
| 5,885,109 | 3/1999 | Lee et al. | 439/652 |
| 5,909,012 | 6/1999 | Todd et al. | 439/654 |

FOREIGN PATENT DOCUMENTS

| | | |
|---|---|---|
| 39 43 752 | 10/1990 | Germany . |
| 40 20 791 | 6/1991 | Germany . |
| 296 13 947 U | 11/1996 | Germany . |

*Primary Examiner*—Paula Bradley
*Assistant Examiner*—Tho D. Ta
*Attorney, Agent, or Firm*—Cohen, Pontani, Lieberman & Pavane

[57] ABSTRACT

A relatively simple assembly and an economical manufacture for the electrical connection of electrical elements arranged in a group, especially electromagnets of valve units, using a multiple-pin electrical bridge connection in which the electrical connection proceeds from contacts of a plug on the input side to contacts of a socket on the output side. The socket is constructed so as to complement the plug. A two-pin or two-pole connection is preferably disposed on the external surface of the electrical bridge connection for connecting electrical elements. All of the electrical connections in the connection element extend three-dimensionally in the form of conductor paths. The connection element (1) is constructed in one piece comprising a plug (2) that forms a first portion, a socket (3) that forms a second portion and a base (4) disposed between the first and second portions and through which the conductor paths are guided.

13 Claims, 8 Drawing Sheets

CONNECTION ELEMENT FOR PROVIDING AN ELECTRICAL CONNECTION TO ELECTRICAL ELEMENTS ARRANGED IN A GROUP

BACKGROUND OF THE INVENTION

1. Field of the Invention

The present invention is directed to a connection element for the electrical connection of electrical elements arranged in a group.

2. Description of the Related Art

Solutions using free wiring are generally known in the art for effecting an electrical connection of electrical elements arranged in a group. In free wiring, individual leads are guided, proceeding from a control unit generating control signals, e.g. a stored-programmable controller (SPS), to the individual electrical elements such as relays, incandescent lamps, sensors or electromagnets of valves which are arranged in groups. For protection against external influences, the leads can be brought together in a cable tree or cable harness. However, free wiring must always be carried out by hand and, in this respect, is encumbered by highly complicated assembly. In addition, the indefiniteness of free wiring makes a flawless assembly more difficult.

A solution is disclosed in German Patent 40 20 791 for simple cabling of electromagnets in valve units to avoid the disadvantages associated with free wiring. A valve unit comprises a quantity of valves grouped in a row. Each valve is controlled by an electromagnet serving as an actuator. In order to supply the individual electromagnets with a binary control signal in the low-voltage range, the electrical leads required for this purpose are accommodated in a protected manner inside a cable duct that runs along the valve unit and is modularly constructed. A common lead is shared among all of the electromagnets and is guided to one connection terminal of the electromagnets. Accordingly, only one signal line needs to be guided to the respective other connection terminal of each of the electromagnets. Since not every electromagnet is wired with a separate pair of leads in this case, the required quantity of signal lines is substantially reduced. Nevertheless, due to the use of individual wires, this solution still requires manual wiring.

German Patent No. 39 43 752 discloses a printed circuit board arrangement with plug-in connectors for the electrical connection of electromagnets in valve units, which avoids manual wiring and further reduces assembly effort. In this reference, printed circuit boards are integrated in connection blocks having pressure-medium ducts such that when a plurality of connection blocks are plugged together, in addition to a connection of the pressure-medium ducts, the electrical connection is also carried out automatically by means of plug connectors that are arranged at the sides of every printed circuit board. For protection against external influences, the printed circuit boards are accommodated within the connection block in a through-channel. While the complexity of assembly may conceivably be reduced in this solution as compared with free wiring due to use of the principle of an electric plug connection, the protective accommodation of the printed circuit boards inside the connection block which serves as a housing results in a highly complex manufacture of the connection blocks.

Therefore, it is the object of the present invention to provide a device for the electrical connection of electrical elements arranged in a group which enables relative simplicity of assembly on the one hand and can also be economically manufactured on the other hand.

SUMMARY OF THE INVENTION

The present invention is directed to a one piece connection element formed of a housing that contains contacts extending between a plug and a socket, and an outgoing electrical connection for electrical elements electrically connected by conductor paths extending in three dimensions. In particular, the plug forms a first portion of the connection element and the socket forms a second portion of the connection element. The two portions are separated from one another by a base through which the conductor paths are guided via small openings in the base. In a preferred embodiment, a two-pin connection is arranged at the connection element, as for example a pair of sockets. The subject matter of the invention is therefore distinguishable from printed circuit board techniques in which the arrangement means for electrically connecting electrical elements arranged in a group is confined to a two-dimensional spatial plane. The inventive three-dimensional arrangement is preferably manufactured using a two-component injection molding technique followed by wet-chemical metallization of a plastic component (MID technique). In this technique, a one piece body is produced from two thermoplastics, wherein one component is metallized or plated, while the other component remains completely untouched or unaffected by the chemical action of the metalizing electrolytes. In this way, one-piece plastic bodies may be fabricated and endowed with partially metallic properties by means of a suitable coating. The metallized plastic can be structured to form conductor paths. Therefore, the invention makes it possible to connect a plurality of electrical elements using a plurality of conductor paths running through the connection element while maintaining relatively small external dimensions with respect to the connection element. The inventive connection element has a filigree plug and socket profile. Close contact spacing is realized by groove-shaped recesses between adjacent contacts to prevent creepage. The separating base situated between the plug and socket is provided with openings through which the conductor paths are guided from the contacts of the plug through the base to contacts of the socket. Complicated cable constructions can therefore be replaced by conductor paths that extend in a three-dimensional manner directly into the connection element. The inventive connection element is fabricated in a relatively simple manufacturing process comprising few steps and thus, may be readily automated. Relatively high-quality connection elements can accordingly be manufactured economically. In particular, assembly costs are eliminated as a result of the one-piece construction and the resulting cost of materials is relatively inexpensive.

In accordance with the invention, two types of connection elements are provided. First, the electrical connection of the contacts of the plug with the contacts of the socket is effected in a pin-matched or same-pin or pin-for-pin construction using a bridge circuit. In this type of connection, the outgoing, preferably two-pole, connection for electrical elements can be used for wiring an electrical element in parallel with another electrical element; this type of connection element is also suitable for spatial bridging of distances between electrical elements. In this case, the connection is not assigned. In another type of connection element, the electrical connection of the contacts of the plug with the contacts of the socket is such that only one contact, preferably a negative contact, of the plug is connected with a same-pin contact of the socket and the other contacts are connected with one another as signal-carrying contacts in a clocked up manner by one contact. In addition to the same-pin looped through negative contact, it is conceivable to arrange a likewise same-pin looped through protective conductor (ground). The branched connection for electrical elements is connected to one pole with a permanently defined signal-carrying contact and is connected to the other pole with the two contacts mentioned above in a pin-for-pin connection. A constructional unit, preferably in a row configuration, can be formed from these two kinds of connection elements, wherein a first connection element is connected via its socket with the plug of a subsequent connection element. An asymmetric configuration of plugs and sockets prevents incorrect plugging together of connection elements with reversed poles. The connection for connecting electrical elements is preferably arranged at the connection element at approximately right angles with respect to a coaxial arrangement of plugs and sockets. Since the two types of connection elements can be arranged in a row in any desired sequence, a device for the electrical connection (constructional unit) built from these connection elements can be used in an extremely flexible manner, and thus is adaptable to many types of use. However, the quantity of connectable electrical elements is limited by the number of electric conductor paths that can be accommodated in the connection element. The goal of accommodating as many conductor paths as possible in the connection element is restricted by the requirement that the volume of the connection element be as small as possible and that a minimum spacing be maintained between the conductor paths. In order to prevent unwanted creepage between the conductor paths in spite of the relatively high level of integration, the conductor paths are advantageously accommodated in the connection element to protect against moisture. For this purpose, the plug of each connection element has a lip sealing bead extending circumferentially and formed integrally with the plug. The lip is received in a groove-shaped recess at the socket of an adjacent connection element to form a seal. The recess is arranged so as to complement the sealing bead.

In another embodiment of the invention, the contacts of the plug of a connection element are provided with a cylindrically curved contact surface which makes in-line contact with a straight contact surface of the contacts of the socket of the adjacent connection element. This results in only a relatively small contact area between the two contacts so that connecting and disconnecting is facilitated in spite of the absence of spring action at the contacts and of a required easy press fit. On the other hand, the very close manufacturing tolerances made possible by the inventive manufacturing technique guarantees a reliable electrical contact between the plug and the socket.

In another embodiment of the invention, a constructional unit of connection elements that are plugged together one after the other is connected to a control unit via the plug of the first connection element in a row of connection elements by a signal cable jack or socket. The constructional unit of connection elements which are plugged in one behind the other may preferably be formed into a row or ring structure. A multiple-pole signal cable may be provided for bridging a distance between the control unit and the constructional unit comprising connection elements. Alternatively, the constructional unit may be connected directly to the control unit by a socket arranged at the control unit.

In order to hold the signal cable socket securely at the first connection element, the first connection element may include a snap-in hook which engages in a projection formed integral with the connection element at its outer surface.

In accordance with the invention, the socket of the final connection element in a row can be closed by a closing cap with a lip sealing bead extending circumferentially around and formed integral with the closing cap. The lip forms a sealing contact with a grooved recess of the socket of the final connection element. Accordingly, the open location of the constructional unit at which the conductor paths are exposed is effectively protected from damaging external influences.

A connection element preferably has at least two signal-carrying contacts so that a quantity of connection elements corresponding to the number of contacts can be plugged together in a row with clocked up signal-carrying contacts. As many connection elements as desired with a same-pin bridge connection can be connected therebetween in order to be able to bridge the distances between electrical elements or to enable parallel wiring of additional electrical elements.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views:

FIG. 5 is a cross-sectional view taken along the line 5—5 in FIG. 4a;

FIG. 6 is a cross-sectional view taken along the line 6—6 in FIG. 4a;

DETAILED DESCRIPTION OF THE PRESENTLY PREFERRED EMBODIMENTS

Figure 1:
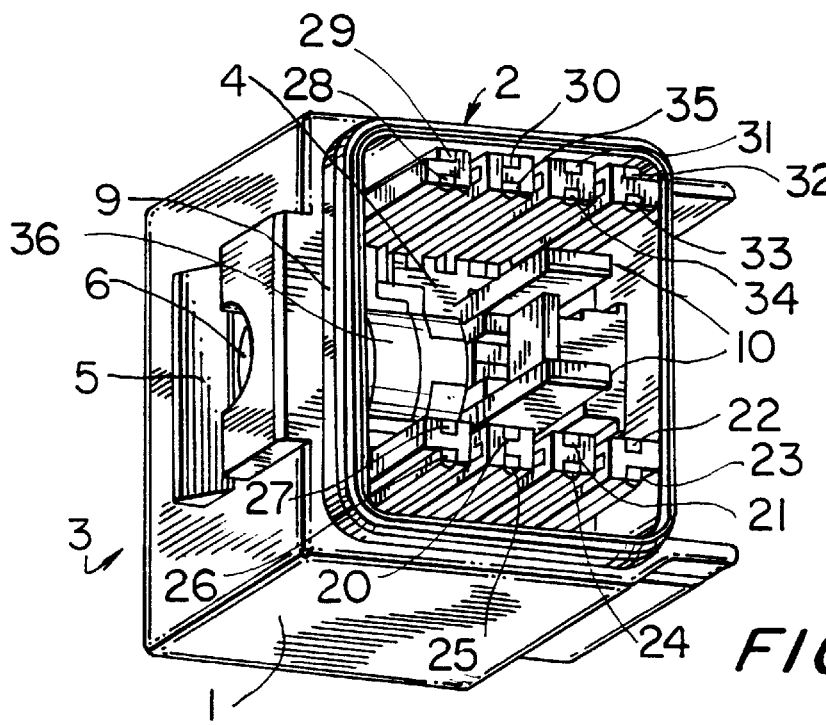
FIG. 1 is a perspective view of a connection element in accordance with the present invention from the direction of the plug.
Figure 2:
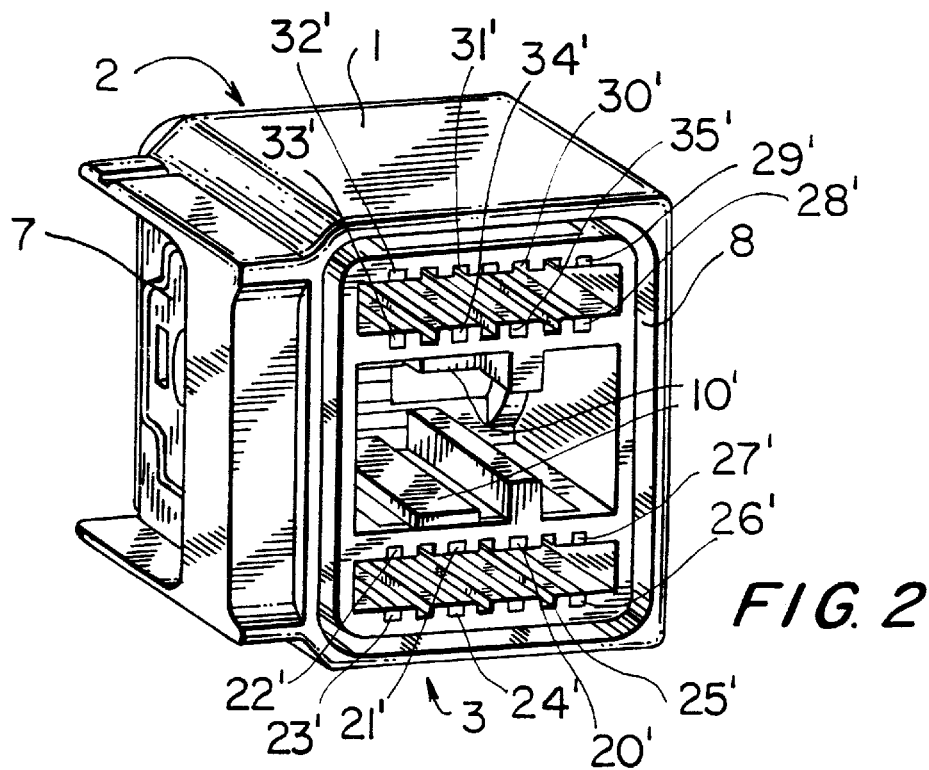
FIG. 2 is a perspective view of the connection element of FIG. 1 from the direction of the socket.
Figure 12:
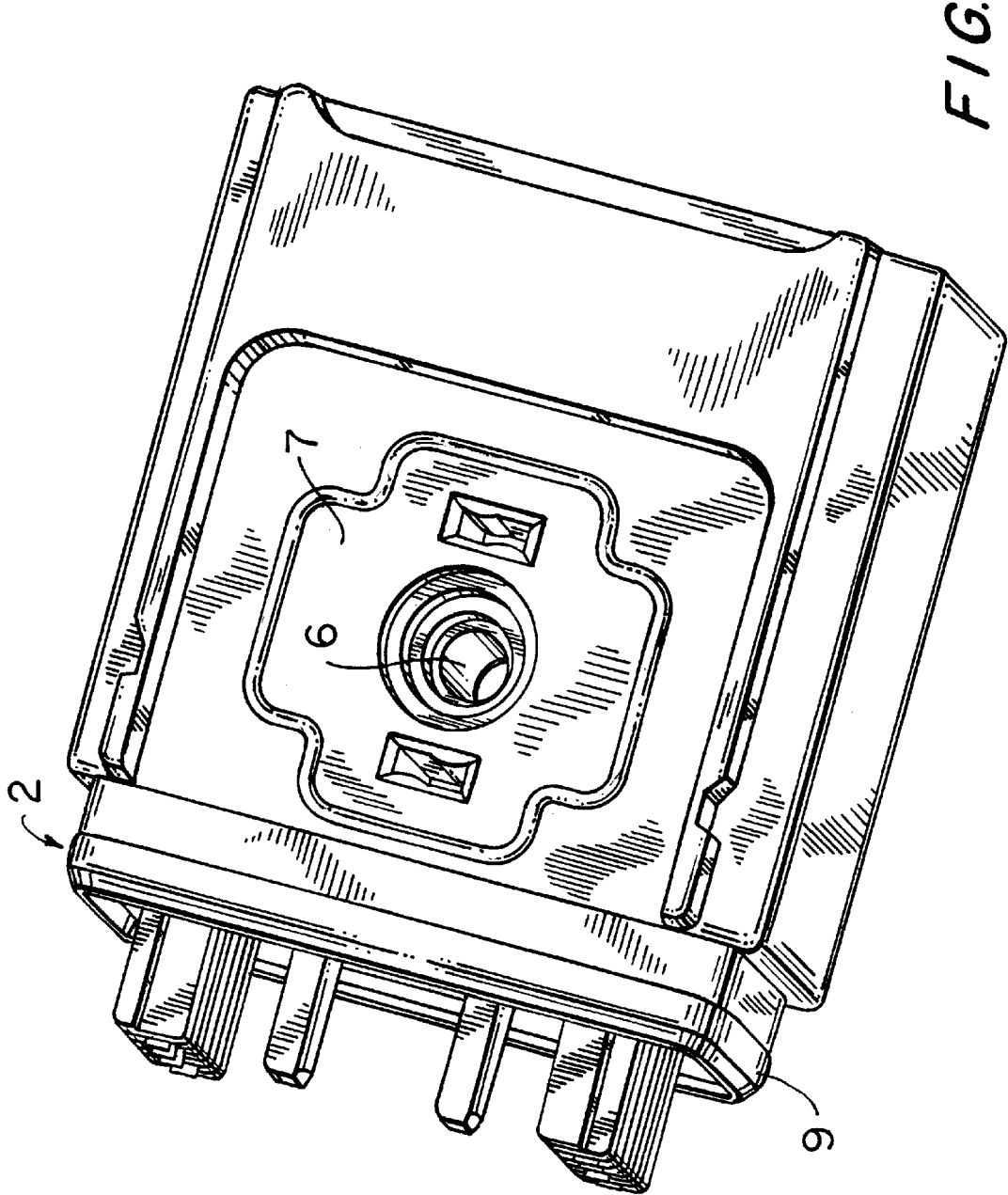
FIG. 12 is a perspective side view of the connection element in FIG. 2.

A square-shaped connection element 1, as shown in FIGS. 1 & 2, is formed as a housing having a first front portion or open end constructed as a plug 2 and a rear second portion or open opposite end constructed as a socket 3. The plug 2 is separated from the socket 3 by a base 4 extending therebetween. A projection 5 is arranged on the outer surface of connection element 1. The projection 5 serves to hold a snap-in clip on the side to ensure that the connection is mechanically secured. A bore hole 6 penetrating the connection element 1 is defined in the region of projection 5 and a fastening screw for connection element 1 is insertable through bore hole 6. A two-pole or two-pin connection 7 for an electromagnet which is connectable to the connection element 1 as an electrical element is arranged along the external surface of connection element 1 opposite from projection 5 and is only partially shown in FIG. 2, but is shown fully in FIG. 12. A circumferential groove 8 is defined on the side on which the socket 3 is located. The groove 8 ensures a sealing connection between interconnected connection elements 1 by means of a sealing lip 9 at the plug 2 as shown in FIGS. 1 and 2. A plurality of connection elements can be connected to one another in a row by their sockets 3 and their plugs 2 so that a plurality of electromagnets are controllable through corresponding two-pole connections 7.

The invention currently contemplates two type of connection elements. In the first type, the electrical connection is transmitted from the contacts of plug 2 to the contacts of socket 3 in a pin-for-pin manner, as in a bridge circuit. In the other or second type, a control signal is supplied to an electromagnet via the two-pole connection 7 while the remaining control signals are transmitted via a bridge circuit. The two types of connection elements 1 may differ from one another with respect to their external arrangements or can carry other distinguishing features, as for example in the form of color marking. The difference is substantially determined by the different internal wiring dictated by their respective tasks. The inventive three-dimensionally arranged conductor paths also differ within the connection element as between two types of connection elements. The preferred course of the conductor paths within a connection module with a same-pin bridge circuit will be specifically described herein below with respect to FIGS. 3a and 3b.

Figure 3A:
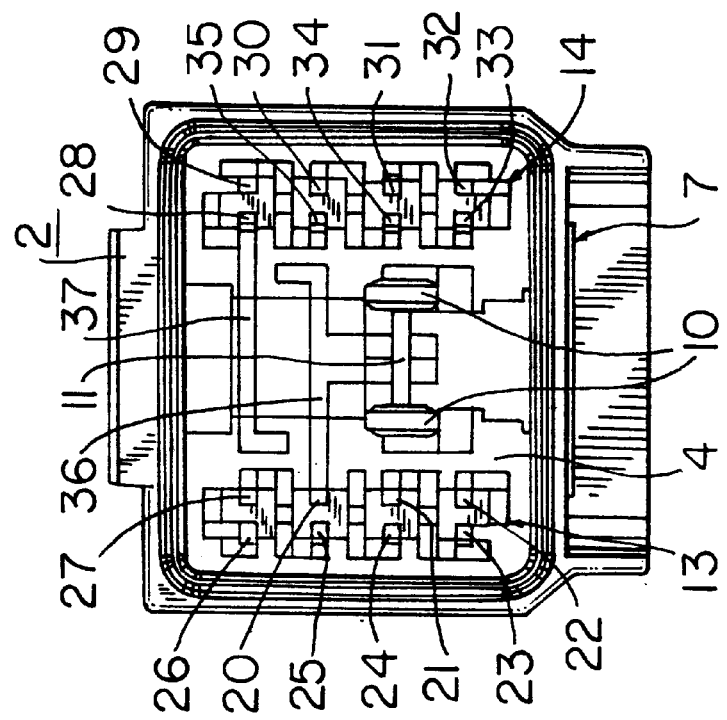
FIGS. 3a and 3b are front views of the plug and the socket, respectively, sides of the connector in which the contacts are connected in a pin-for-pin manner.
Figure 3B:
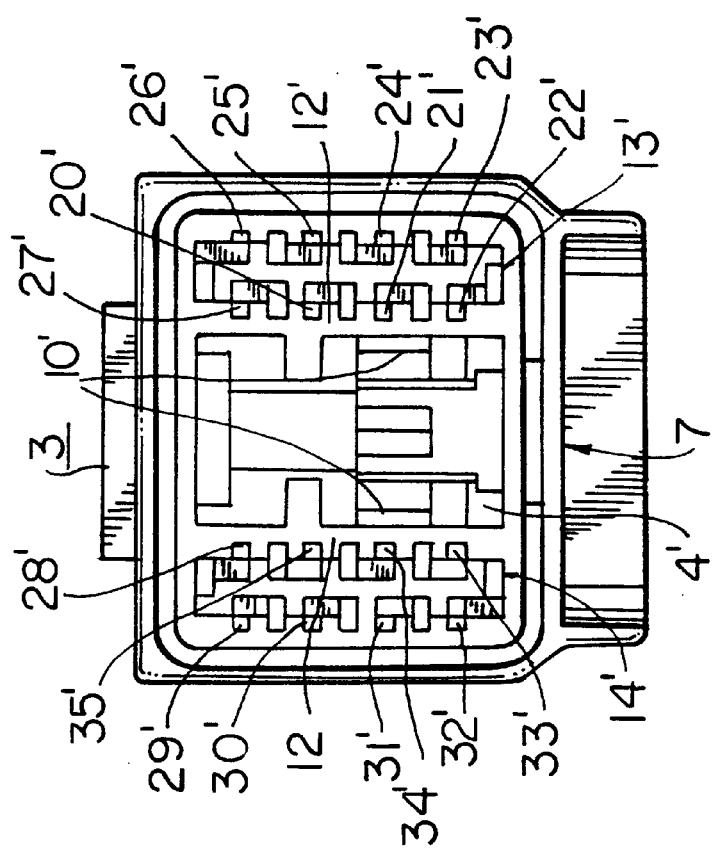

In FIGS. 3a and 3b, a relatively large negative contact 10 is arranged in the center of plug 2. The negative contact 10 has two separate contact halves which are held by a web 11 disposed therebetween. A conductor path runs on the outside along both contact halves at the sides of the two contact halves located opposite one another up to the base 4 of the plug. At the base 4 the conductor path wraps around an edge of the contact at a right angle and through an opening, not shown in FIG. 3, in the base 4 to the negative contact 10' of the socket 3 which is arranged opposite the first negative contact 10 on the other side of base 4. The negative contact 10' likewise has two contact halves that are located on opposite sides at the cross pieces 12, 12'. Plugging the connection elements together accordingly results in a same-pin connection of negative contacts 10 and 10'. The signal-carrying contacts 20 to 35 are connected with one another in accordance with the same principle in the type of connection element 1 having a same-pin bridge circuit. The sixteen signal-carrying contacts 20 to 35 are arranged on two rectangular oppositely situated contact regions 13 and 14, 13' and 14' that are concentrated in the profile of the plug 2 and socket 3. For example, with respect to contact region 13, every four contacts are arranged opposite one another in a row. A groove is defined between two adjacent contacts of a row to prevent unwanted creepage between each two adjacent contacts while, at the same time, ensuring relatively small contact spacing.

Figure 11A:
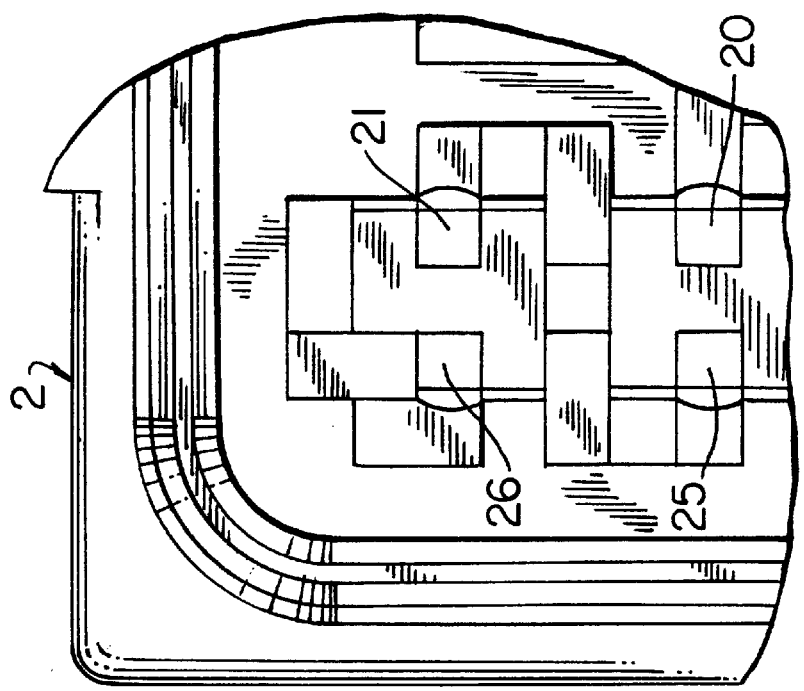
FIGS. 11a and 11b show an enlarged portion of the plug and socket in FIGS. 3a and 3b.
Figure 11B:
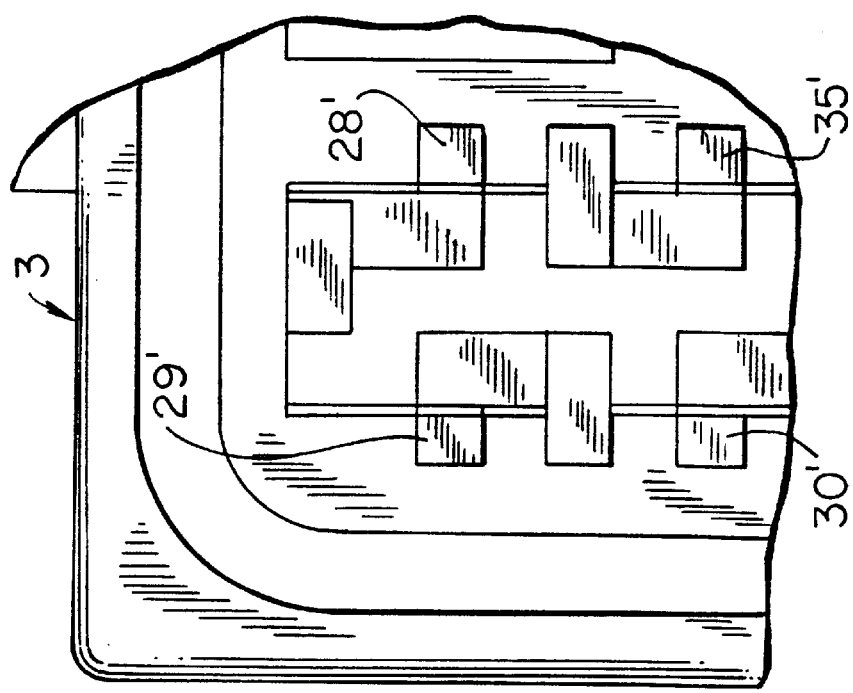

The first signal-carrying contact 20 of the plug 2 has an outwardly curved contact surface (see FIG. 11a). The conductor path running along the contact surface extends up to the base 4, passes at a right angle to the right of the edge of the groove adjacent the contact, and through the opening in the base 4 (which opening is located in the groove and is not shown) to the other side of the base 4'. At the other side of the base 4' of socket 3 the conductor path extends out from the groove at a right angle around the groove edge at the contact 20' of socket 3. Contact 20' is located opposite contact 20 of plug 2. The remaining fifteen contacts 21 to 35 of plug 2 are similarly wired in a pin-for-pin manner with the analogous contacts 21' to 35' of socket 3. Additional conductor paths 36 and 37, shown in FIG. 3a, which extend along the base 4 are used in the other type of connection element 1 for the connection of electromagnets for a corresponding electrical connection fulfilling this function. Since the conductor paths are not required in the type of connection element with a same-pin bridge circuit, which is used solely for bridging distances, they may be disconnected. FIG. 11b shows the planar contacts of the socket 3, which are contacted by the curved contacts of the plug 2.

Figure 4A:
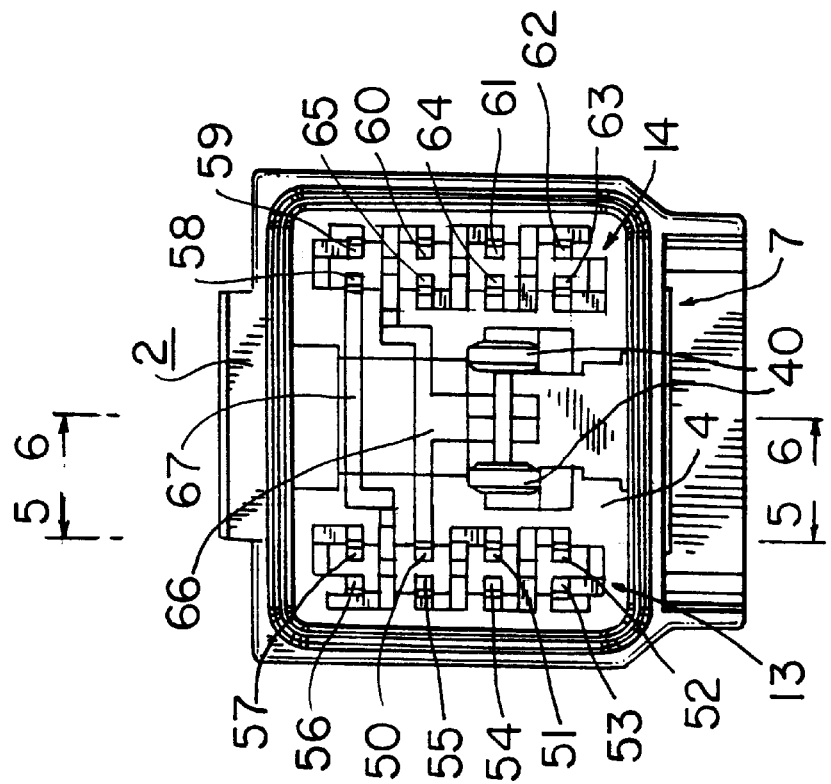
FIGS. 4a and 4b are front views of the plug and the socket, respectively, sides of the connector in which the contacts are connected in a clocked-up manner.
Figure 4B:
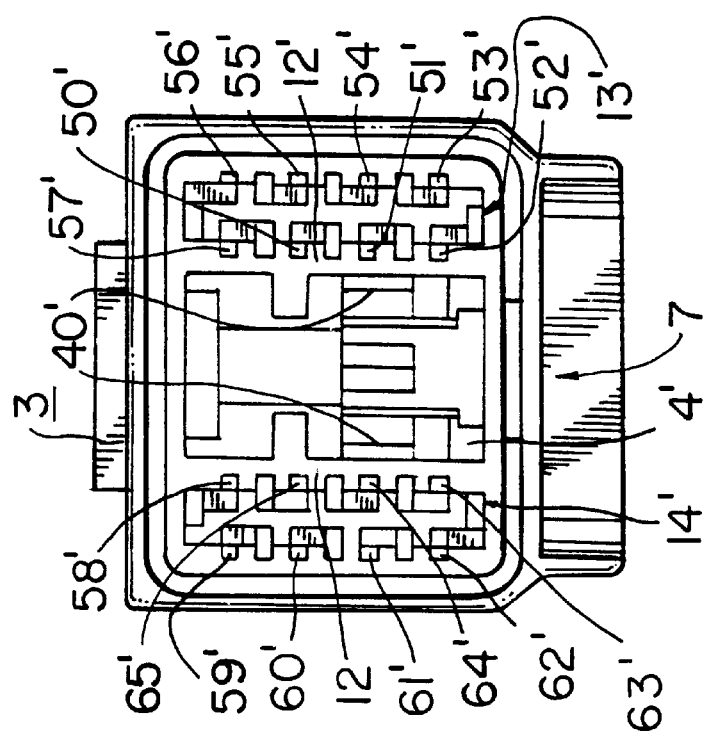

As shown in FIGS. 4a and 4b, the second or other type of connection element 1 has a somewhat different conductor path arrangement. However, the negative contact 40 has a same-pin connection with the negative contact 40' located opposite the base 4 in a manner similar to that described above and, in addition, with the pole of the two-pole connection (not shown in FIGS. 4). The signal-carrying contacts 50 to 65 in this second type of connection element are wired pursuant to a different principle. In this case, a conductor path extends along the first signal-carrying contact 50 of plug 2 up to base 4. From base 4, a connection is made with the second pole (not shown in FIG. 4) of the two-pole connection 7 for electromagnets by the conductor path 66 which extends over base 4. A conductor path 67 is also defined from contact region 13 to contact region 14 through base 4 and extends to contact 65' of socket 3. This connection can optionally be employed so that two parallel-connected electromagnets can be controlled via a single control signal, since the contact 65' of socket 3 generally remains unused due to the special conductor path configuration of this embodiment.

The conductor path of the second signal-carrying contact 51 at plug 2 extends to the base 4 and is guided over base 4 such that it runs initially to the left around the edge of the groove adjacent the second contact 51. From there, the conductor path passes through the opening defined in the groove area in base 4 to the socket 3 on the other side and out of the groove area at a right angle around the groove edge to contact 50'. In a similar manner, signal-carrying contacts 52 to 65 of plug 2 are connected to contacts 51' to 64', respectively, in socket 3. The final signal-carrying contact 65' of socket 3 can remain free, if necessary, as described above.

To summarize, in connection elements 1 of the first type with two-pole connection 7, the same signal-carrying contact is always connected to one pole of the two pole connection 7. The other pole of the two-pole connection 7 is connected to the negative contact 40, 40' which is looped through in a pin-for-pin manner. The remaining fifteen signal-carrying contacts are wired in the above-described manner so as to be clocked up by one contact.

Figure 5:
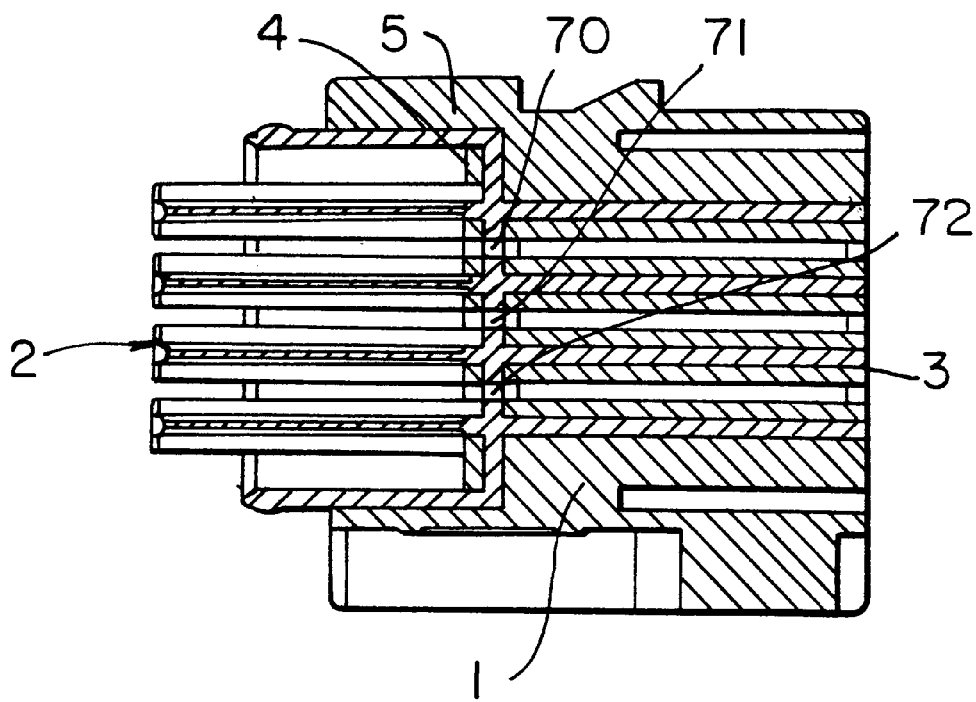

FIG. 5 shows openings 70 to 72 which are defined in base 4 for guiding the conductor paths therethrough from plug 2 to socket 3. When providing openings of this type, a minimum diameter or minimum edge width is maintained to ensure reliability in the wet-chemical metalizing process and formation of a closed conductor path.

Figure 6:
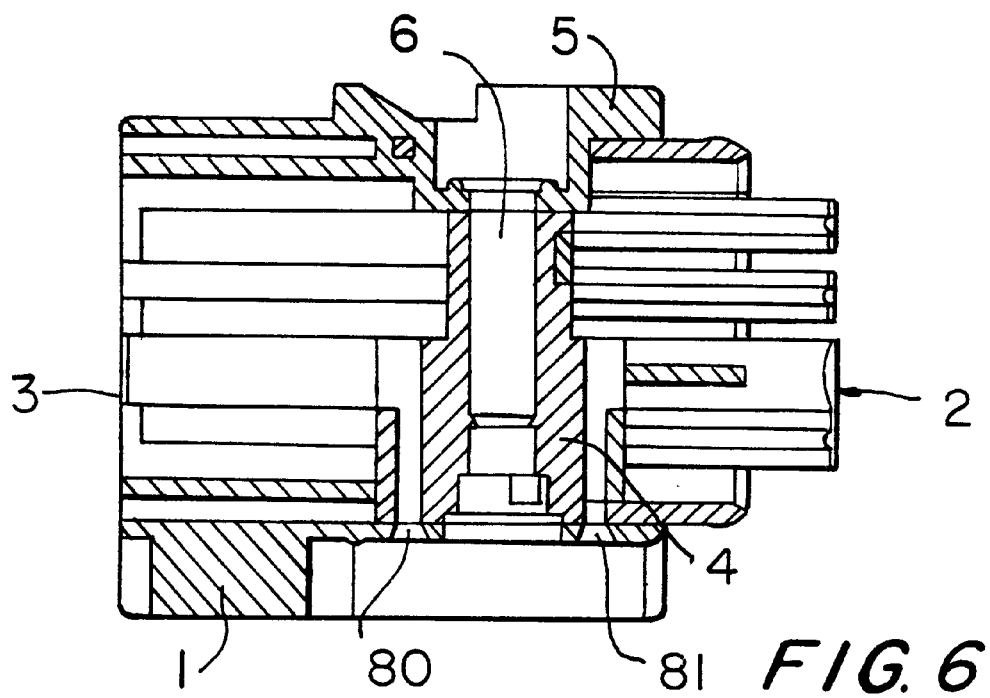

FIG. 6 indicates the position of the two poles 80 and 81 of the two-pole connection 7 for electromagnets. Also shown in FIG. 6 is the stepped through-bore hole 6 in base 4 which receives a screw (not shown) to fasten a connection element 1 to the electromagnet.

Figure 7:
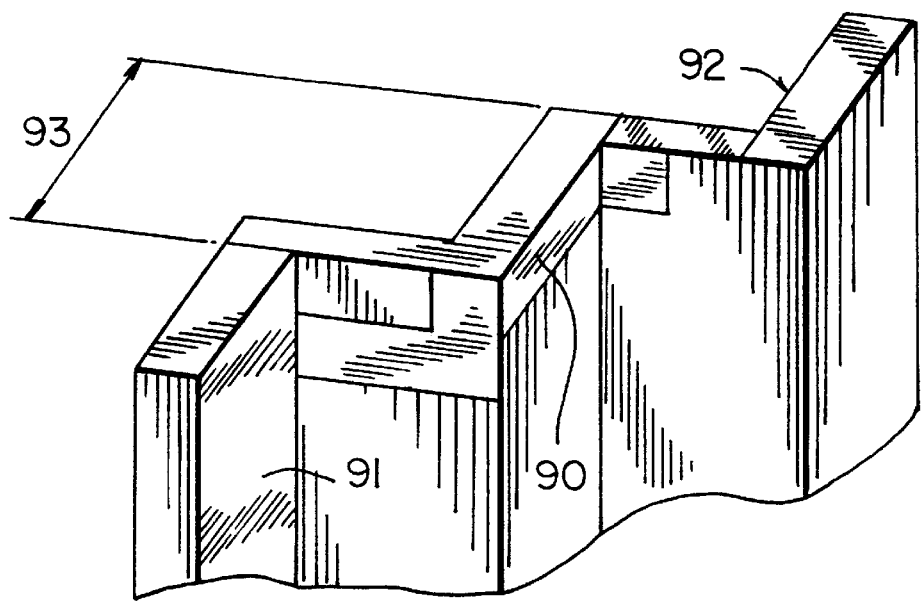
FIG. 7 is a three-dimensional configuration of a conductor path in the connection element of FIG. 1.

FIG. 7 depicts, a suitable course of a conductor path 90 that is removed from the overall system of connection element 1 and which connects the signal-carrying contact surfaces 91 and 92. Proceeding from contact surface 91, the conductor path 90 passes through a base area 93, on which it runs in an angular manner so as to be offset three-dimensionally in several planes, to the contact surface 92.

Figure 8:
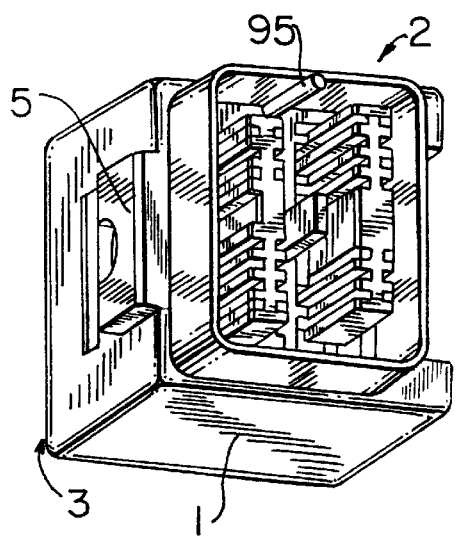
FIG. 8 is a perspective view of another embodiment of a plug of a connection element in accordance with the present invention.
Figure 9:
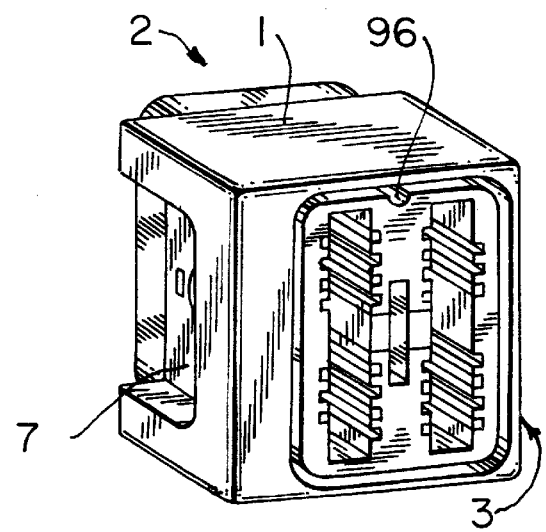
FIG. 9 is a perspective view of the socket of the connection element of FIG. 8.

In addition to the profile of plug 2 of preferred exemplary embodiment described hereinabove, other advantageous profiles or configurations in shape or structure of the plug 2 are within the intended scope and contemplation of the invention. For example, an alternative plug profile is shown in FIG. 8 and its complementary socket 3 profile in FIG. 9. In this alternative configuration, an extension 95 in plug 2 serves as a nonreversible contacting member to protect against mismatching of connecting pins. Extension 95 is arranged complementary to a recess 96 defined in the socket 3. It is also within the intended scope of the invention to construct the profiles of the plug and socket in a curvilinear or arcuate form—such as cross-sectionally round or oval, or in the form of rings—which are inserted one into the other to ensure an advantageous arrangement of the interconnecting contacts. A cylindrical contact for the neutral conductor is preferably located at approximately the center of the innermost ring.

Figure 10:
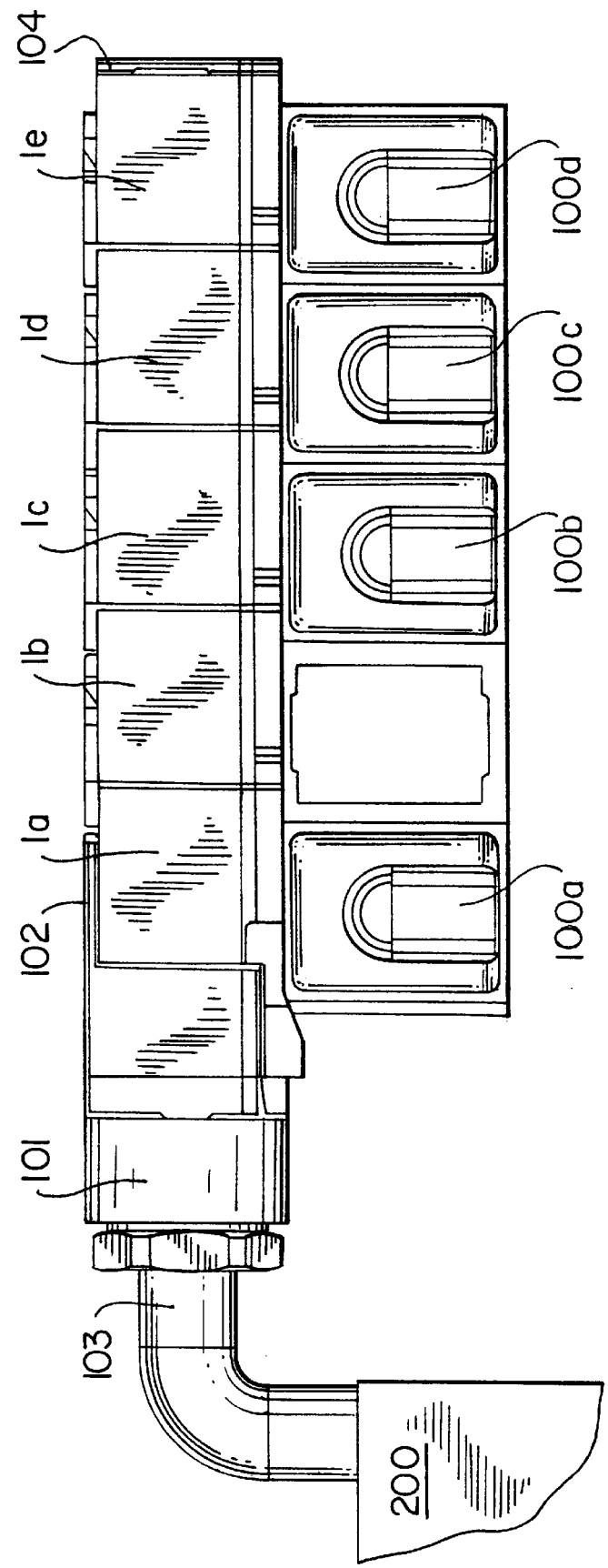
FIG. 10 depicts a constructional unit of interconnected connection elements according to the present invention for the electrical connection of electromagnets in valves.

As shown by way of illustration in FIG. 10, a constructional unit of five inventive connection elements 1a to 1e are connected one behind the other to connect four valves 100a to 100d with associated base plates for a pressure medium connection. Because of the wider construction of the valve 100b in comparison to the other valves 100a, 100c and 100d, connection element 1b is a same-pin bridge type connection element. Accordingly, the distance between the valve 100a and the larger valve 100b can be bridged. The rest of the connection elements 1a, 1c, 1d and 1e are, on the other hand, of the type having a two-pole connection 7 for electromagnets. A control signal is supplied via the signal cable socket 101 at the end of a signal cable 103. The signal cable 103 is routed from a control unit 200 shown in FIG. 10, as for example a stored-program controller (SPS). A snap-in hook 102 is provided at the signal cable socket 101 for securing the plug connection. A cover cap 104 may also be connected to the final connection element 1e of the row to protect the exposed conductor paths from external influences, such as moisture.

FIG. 10 depicts the arrangement of the connection elements 1a to 1e directly at electromagnets of the valves 100a to 100d associated therewith. The row of connection elements 1a to 1e, which are connected one behind the other, is accordingly located at the valves 100a to 100d associated therewith so as to be visible from the outside. Alternatively, the individual connection elements 1 can be integrated in a fluid base plate (not shown) associated with each valve 100 or fastened directly to the base plate.

Thus, while there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A unitary multiple-pin electrical bridge connection element for effecting electrical connections to a plurality of electrical elements arranged in a group, said connection element comprising:

a housing having oppositely-disposed opened first and second ends;

a plug defined at said first end and having first electrical contacts;

a socket defined at said second end and having second electrical contacts electrically connected to the first contacts of said plug and constructed to complement said plug so that said connection element is interconnectable abuttingly together with a further connecting element via the first contacts of one of the two connection elements designed in physical and electrical contact with the second contacts of the other of the two connection elements;

a base in said housing and interposed between said plug and socket;

a plurality of conductor paths extending three-dimensionally on and through said base between said plug and said socket for electrically interconnecting said first and second contacts; and a two-pole connector disposed on an exterior wall of said housing between said plug and said socket for use in effecting an electrical contact between a further electrical element and the connection element, a through-bore hole penetrating the housing for receiving a screw to fasten the connecting element to said further electrical element, said plug, socket and base being made from injection-molded plastic as a one-piece construction and said plurality of conductor paths being metallized portions of the plastic.

2. The electrical connection element in accordance with claim 1, wherein said electrical contacts of each of said plug and said socket comprise a negative contact and a plurality of signal-carrying contacts, said negative contact and signal-carrying contacts of said plug being electrically connected in one of a pin-for-pin and same-pin manner to the negative contact and signal-carrying contacts of said socket, and wherein said two-pole connector remains unconnected.

3. The electrical connection element in accordance with claim 1, wherein said exterior wall portion on which said two-pole connector is disposed extends at a substantially right angle to an axis extending between said first and second ends of the housing.

4. The electrical connection element in accordance with claim 1, wherein said electrical contacts of each of said plug and said socket comprise a negative contact and signal-carrying contacts, and wherein said negative contact of said plug is electrically connected to said negative contact of said socket in one of a pin-for-pin and a same-pin manner, and the signal-carrying contacts of said plug and said socket are connected to one another in a clocked up manner by a single contact, and wherein a permanently defined one of said signal-carrying contacts of said plug is connected to one pole of said two-pole connector and the other pole of said two-pole connector is connected to the negative contacts of said plug and said socket.

5. The electrical connection element in accordance with claim 4, wherein said plug and said socket have asymmetrical surfaces configured so as to permit the plug of one of said connection elements to be matingly interconnected with the socket of a second of said connection elements in a single predetermined orientation.

6. A constructional unit comprising:
a plurality of multiple-pin electrical bridge connection elements being connectable in a row and including a first connection element and a final connection element in the row, wherein each said connection element has an outer surface and each connection element comprises:
a housing having oppositely-disposed opened first and second ends;
a plug defined at said first end and having first electrical contacts;
a socket defined at said second end and having second electrical contacts electrically connected to the first contacts of said plug and constructed to complement said plug so that two of said connection elements can be interconnected abuttingly together with the first contacts of one of the two connection elements designed in physical and electrical contact with the second contacts of the other of the two connection elements;
a base in said housing and interposed between said plug and socket;
a plurality of conductor paths extending three-dimensionally on and through said base between said plug and said socket for electrically interconnecting said first and second contacts; and
a two-pole connector disposed on an exterior wall of said housing between said plug and said socket for use in effecting an electrical contact between an electrical element and the connection element;
said socket of one connection element being connectable to said plug of an adjacent connection element, a through-bore hole penetrating the housing for receiving a screw to fasten the connecting element to said electrical element, said plug, socket and base being made from injection-molded plastic as a one-piece construction and said plurality of conductor paths being metallized portions of the plastic.

7. The constructional unit in accordance with claim 6, wherein said plug of each connection element has an integrally formed circumferentially extending lip sealing bead and said socket of each connection element has a complementary grooved recess defined therein which forms a sealing contact with said lip sealing bead of an adjacent connection element.

8. The constructional unit in accordance with claim 7, wherein the contacts of said plug of one connection element have an outwardly curved contact surface that contacts with a substantially planar contact surface of the contacts of said socket of an adjacent connection element.

9. The constructional unit in accordance with claim 8, further comprising:
a signal cable socket connected to said plug of the first connection element in the row of connection elements; and
a control unit connected to said signal cable socket.

10. The constructional unit in accordance with claim 9, further comprising:
a projection extending from the outer surface of one of said plural connection elements and integral therewith; and
a snap-in hook disposed at said signal cable socket, wherein said snap-in hook is engageable by said projection.

11. The constructional unit in accordance with claim 10, a closing cap connectable to said socket of the last connection element, said closing cap having a lip sealing bead extending circumferentially around said closing and cap formed integral therewith, said closing cap forming a sealing contact in a grooved recess of said socket of the final connection element.

12. The constructional unit in accordance with claim 11, wherein each electrical connection element further comprises at least two signal-carrying contacts including a first signal-carrying and a final signal-carrying contact, and wherein a quantity of connection elements corresponding to a number of contacts is connectable together in a row with clocked up signal-carrying contacts and any desired number of connection elements having a same-pin bridge connection are connectable therebetween.

13. The constructional unit in accordance with claim 12, wherein the first signal-carrying contact of said plug is connected to the final signal-carrying contact of said socket by the conductor path extending along said base for simultaneous control of two parallel-connected electromagnets of valves.

* * * * *